United States Patent
Jung et al.

(10) Patent No.: US 8,416,063 B2
(45) Date of Patent: Apr. 9, 2013

(54) METHOD AND APPARATUS FOR STOPPING POWER SUPPLY IN RFID SYSTEM

(75) Inventors: Jae-Young Jung, Daejeon (KR); Hae Won Son, Daejeon (KR); Jun Ho Yeo, Daejeon (KR); Jong Hyun Seo, Daejeon (KR); Su Na Choi, Daejeon (KR); Gil Young Choi, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1113 days.

(21) Appl. No.: 11/878,000

(22) Filed: Oct. 24, 2007

(65) Prior Publication Data

US 2008/0136594 A1    Jun. 12, 2008

(30) Foreign Application Priority Data

Dec. 8, 2006  (KR) .................. 10-2006-0124765

(51) Int. Cl.
*H04Q 5/22*    (2006.01)
(52) U.S. Cl. .................................. 340/10.34
(58) Field of Classification Search ............... 340/10.34, 340/10.33, 12.5, 13.25, 505
See application file for complete search history.

(56) References Cited

U.S. PATENT DOCUMENTS

| | | | | |
|---|---|---|---|---|
| 5,173,614 A | * | 12/1992 | Woehrl et al. | 307/10.1 |
| 5,448,242 A | | 9/1995 | Sharpe et al. | |
| 5,825,806 A | * | 10/1998 | Tuttle et al. | 375/141 |
| 6,525,648 B1 | * | 2/2003 | Kubler et al. | 340/10.33 |
| 6,593,845 B1 | * | 7/2003 | Friedman et al. | 340/10.33 |
| 6,707,376 B1 | * | 3/2004 | Patterson et al. | 340/10.3 |
| 2005/0020321 A1 | | 1/2005 | Rotzoll | |
| 2005/0052279 A1 | * | 3/2005 | Bridgelall | 340/10.1 |

FOREIGN PATENT DOCUMENTS

| | | |
|---|---|---|
| JP | 10-302028 A | 11/1998 |
| JP | 2004-064328 | 2/2004 |
| JP | 2004-064328 A | 2/2004 |
| KR | 1999-023122 A | 3/1999 |

* cited by examiner

*Primary Examiner* — Vernal Brown
(74) *Attorney, Agent, or Firm* — Ladas & Parry LLP

(57) ABSTRACT

Provided are a method and apparatus for stopping power supply to a radio frequency identification (RFID) system. The apparatus includes: a power supplier supplying power to a high RFID tag; an input unit rectifying and boosting an input predetermined frequency band signal and outputting a direct-current (DC) voltage signal; a wake-up determiner comparing a voltage of the DC voltage signal output from the input unit with a predetermined reference voltage and outputting a HIGH signal or a LOW signal; and a switch stopping power supply to the high RFID tag if the wake-up determiner outputs the LOW signal.

14 Claims, 5 Drawing Sheets

METHOD AND APPARATUS FOR STOPPING POWER SUPPLY IN RFID SYSTEM

CROSS-REFERENCE TO RELATED PATENT APPLICATION

This application claims the benefit of Korean Patent Application No. 10-2006-0124765, filed on Dec. 8, 2006, in the Korean Intellectual Property Office, the disclosure of which is incorporated herein in its entirety by reference.

BACKGROUND OF THE INVENTION

1. Field of the Invention

The present invention relates to a method and apparatus for stopping power supply in a radio frequency identification (RFID) system, and more particularly, to a method and apparatus for determining whether a battery included in a RFID tag is powered using a continuous wave signal and a command signal of a RFID reader.

The present invention was supported by the IT R&D program of Ministry of Information and Communication Republic of Korea (MIC). [2005-S-106-02, Development of Sensor Tag and Sensor Node Technologies for RFID/USN]

2. Description of the Related Art

Conventionally, in a radio frequency identification (RFID) technique, tags are attached to respective objects, and unique identifications (IDs) in the tags are wirelessly recognized so that corresponding information included in the tags can be collected, stored, processed, and traced in order to provide a service in terms of the locations of the objects, a remote processing, management, and information exchange between the objects.

As a replacement of conventional barcodes, the RFID technique of using tags is applied to various fields such as from material management and distribution to security. Therefore, it is expected that the RFID technique will become a new market in the industry.

RFID systems can be classified according to how readers and tags communicate with each other, whether the tags are powered, and where the frequency bandwidth the readers and tags use is. The readers and tags are either mutually inducing a method or an electromagnetic method depending on how the readers and tags communicate. The readers and tags are either battery-powered or passive according to how the tags are powered. The readers and tags operate in a long middle, short, ultra-short, or extremely ultra-short range according to their frequencies. A variety of types of standards of RFID systems are established or are currently being established.

FIG. 1 is a block diagram of a conventional passive RFID tag. Referring to FIG. 1, the conventional passive RFID tag, which is not powered, that uses a reflective wave of an RFID reader includes an RF antenna 101, a voltage booster 102, an electrically erasable programmable read-only memory (EEPROM) 103, a demodulator 104, a controller 105, and a modulator 106.

The conventional passive RFID tag, which is not powered, operates the EEPROM 103 and the controller 105 using an output voltage of the voltage booster 102 (W) that increases the power of an electronic wave received through the RF antenna 101. When the RFID reader and the conventional passive RFID tag are far away from each other (for example, by more than 5 m), the conventional passive RFID tag cannot generate the voltage necessary for operating the EEPROM 103 and the controller 105. In more detail, the recognition distance of the conventional passive RFID tag is limited to about 5 m, and the recognition information on the conventional passive RFID tag is unreliable if the conventional passive RFID tag is attached to a metal object.

Thus, active and semi-active tags are battery-powered, and thus, the active and semi-active tags have a longer recognition distance than the conventional passive RFID tags and can be applied to more applications than passive tags, however, the active and semi-active tags suffer from a limited battery lifespan.

SUMMARY OF THE INVENTION

The present invention provides a method and apparatus for reducing current consumption and increasing a battery lifespan of a battery-powered high radio frequency identification (RFID) tag in a stand-by mode.

According to an aspect of the present invention, there is provided an apparatus for stopping power supply to a radio frequency identification (RFID) system, the apparatus comprising: a power supplier supplying power to a high RFID tag; an input unit rectifying and boosting an input predetermined frequency band signal and outputting a direct-current (DC) voltage signal; a wake-up determiner comparing a voltage of the DC voltage signal output from the input unit with a predetermined reference voltage and outputting a HIGH signal or a LOW signal; and a switch stopping power supply to the high RFID tag when the wake-up determiner outputs the LOW signal.

According to another aspect of the present invention, there is provided a method of stopping power supply to a RFID system, the method comprising: rectifying and boosting an input predetermined frequency band signal and outputting a DC voltage signal; comparing a voltage of the DC voltage signal output from the input unit with a predetermined reference voltage and outputting a HIGH signal or a LOW signal; and stopping power supply to the high RFID tag if the wake-up determiner outputs the LOW signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
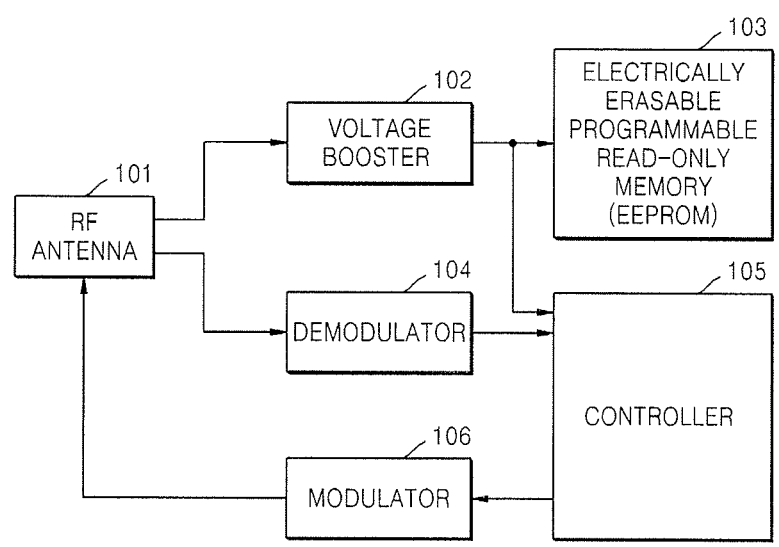
FIG. 1 is a block diagram of a conventional passive radio frequency identification (RFID) tag.
Figure 2:
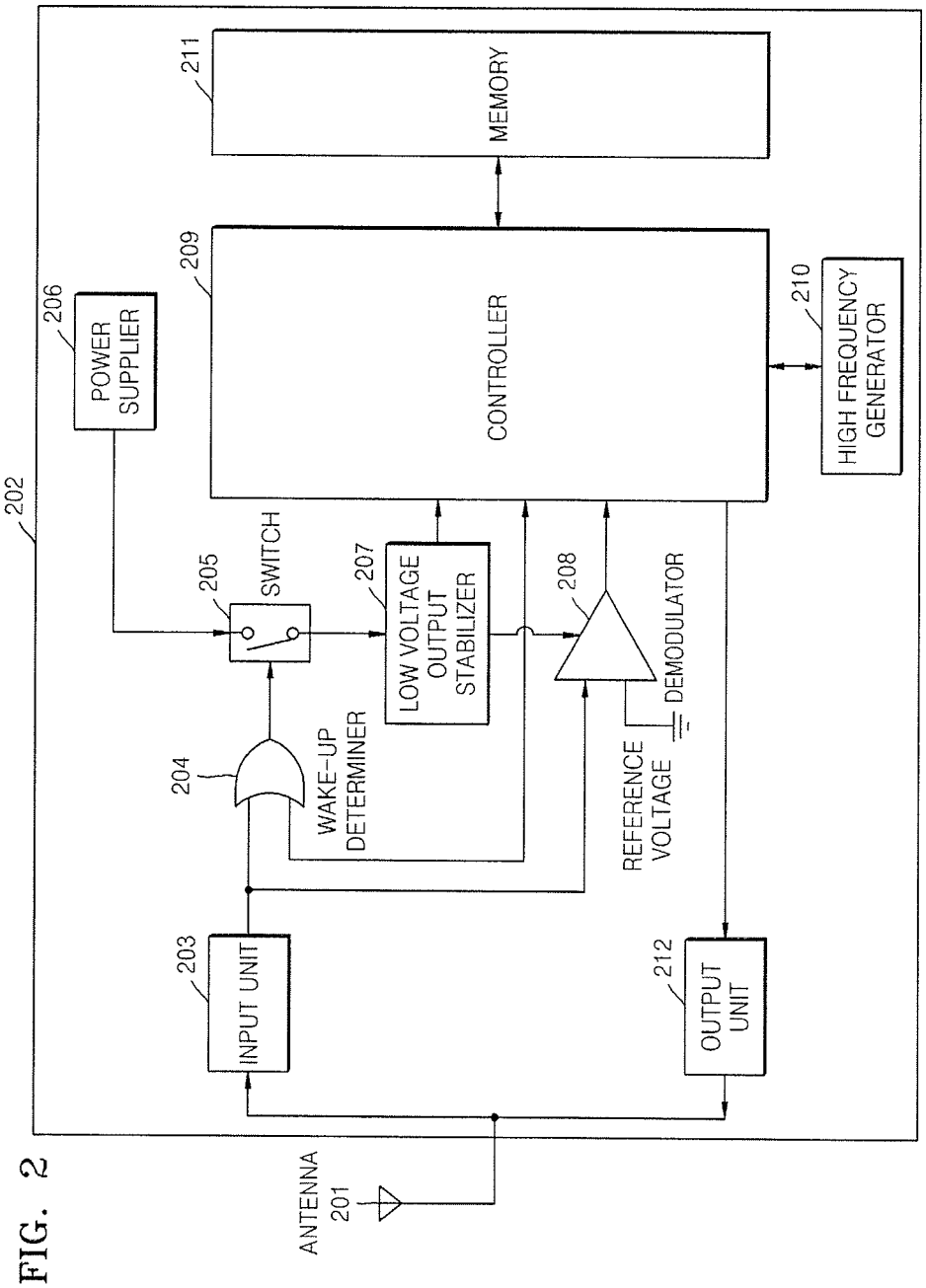
FIG. 2 is a block diagram of a battery-powered high RFID tag including an apparatus for stopping power supply according to an embodiment of the present invention.

FIG. 2 is a block diagram of a battery-powered high radio frequency identification (RFID) tag including an apparatus for stopping power supply according to an embodiment of the present invention. Referring to FIG. 2, the battery-powered high RFID tag of the present invention includes an antenna 201 and a tag system 202. An input unit 203 of the tag system 202 receives a signal from a RFID reader through the antenna 201.

The signal input into the input unit 203 includes a continuous wave signal and a base band signal including a command of the RFID reader.

The input unit 203 rectifies and boosts the continuous wave signal received through the antenna 201, outputs a direct-current (DC) voltage signal, and transmits the DC voltage signal to a switch 205 through a wake-up determiner 204.

The wake-up determiner 204 is an OR-gate having two input terminals in which if one of the two input terminals is HIGH, a HIGH output results.

A first input terminal of the wake-up determiner 204 receives a signal from the output of the input unit 203. A second input terminal of the wake-up determiner 204 receives a signal from a controller 209.

If an output value of the DC voltage that is rectified and boosted by the input unit 203 is less than the value of a threshold voltage Vth, the input unit 203 transmits a LOW signal to the first input terminal of the wake-up determiner 204 so that an output value of the wake-up determiner 204 is LOW. If the output value of the DC voltage is greater than the value of the threshold voltage Vth, the input unit 203 transmits a HIGH signal to the first input terminal of the wake-up determiner 204 so that the output value of the wake-up determiner 204 is HIGH.

Therefore, the HIGH signal generated for a predetermined time period operates the switch 205 and supplies the power of a power supplier 206 to a low voltage output stabilizer 207. The predetermined time period means time enough to change a stand-by mode of the controller 209 to an active mode by supplying the power of the power supplier 206 to the low voltage output stabilizer 207 through the operation of the switch 205.

The low voltage output stabilizer 207 supplies a predetermined voltage to the controller 209 and a demodulator 208 using the power supplied by the power supplier 206 through the switch 205. If a stable voltage is supplied to the controller 209, the controller 209 is changed from the stand-by mode to the active mode, and supplies the stable voltage to the wake-up determiner 204, a high frequency generator 210, and a memory 211.

The controller 209 that supplies the predetermined voltage to the wake-up determiner 204 allows the wake-up determiner 204 including the OR gate to always supply the HIGH signal to the switch 205.

The high frequency generator 210 provides a predetermined clock necessary for the operation of the tag system 202. The memory 211 provides a memory storing data necessary for the operation of the tag system 202.

The demodulator 208 that receives the predetermined voltage transmits the base band signal of the RFID reader received through the antenna 201 to the controller 209.

The controller 209 that is in the active mode reads the command of the RFID reader received through the demodulator 208, executes the command, and transmits the result of executing the command to the RFID reader through an output unit 212 and the antenna 201.

Figure 3A:
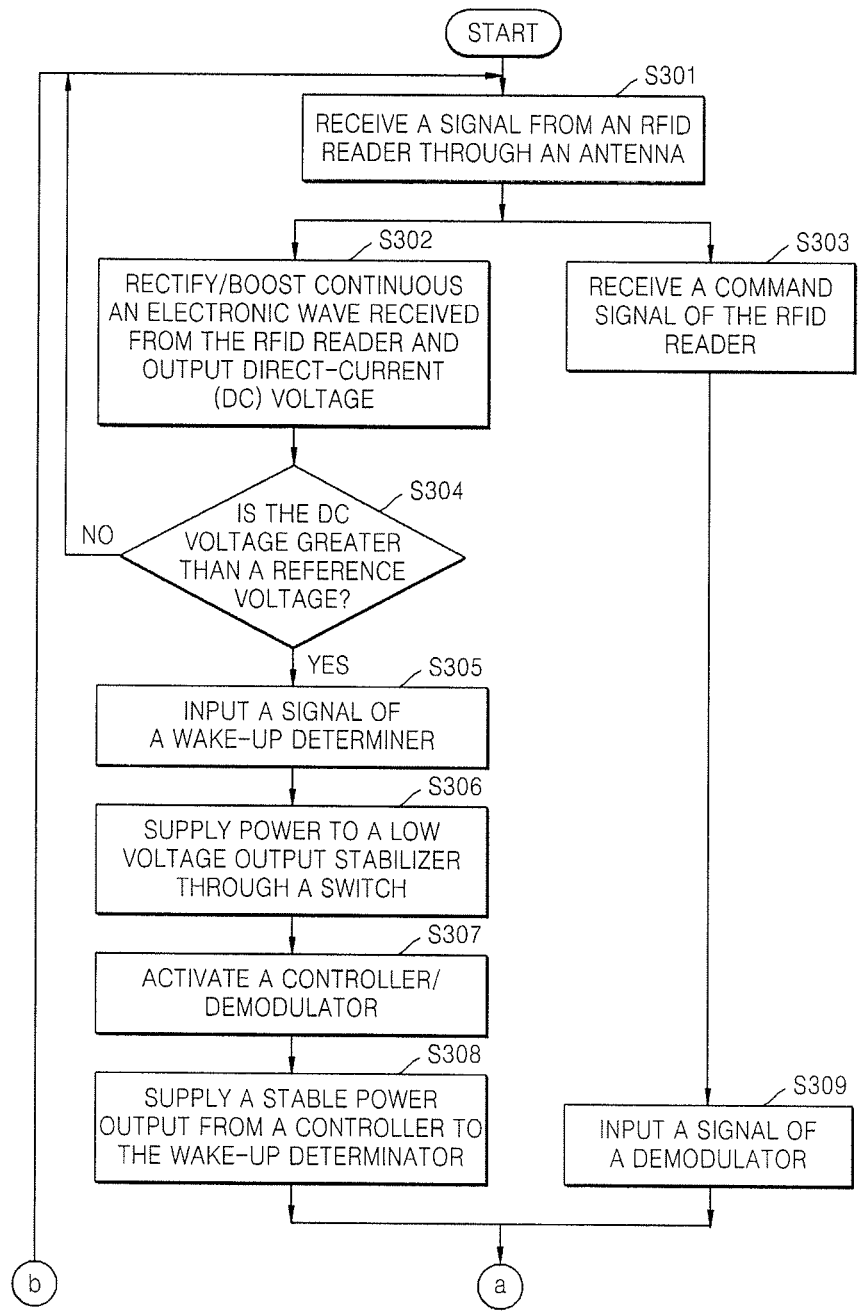
FIGS. 3A and 3B are a flowchart illustrating the operation of a battery-powered high RFID tag including an apparatus for stopping power supply according to an embodiment of the present invention.
Figure 3B:
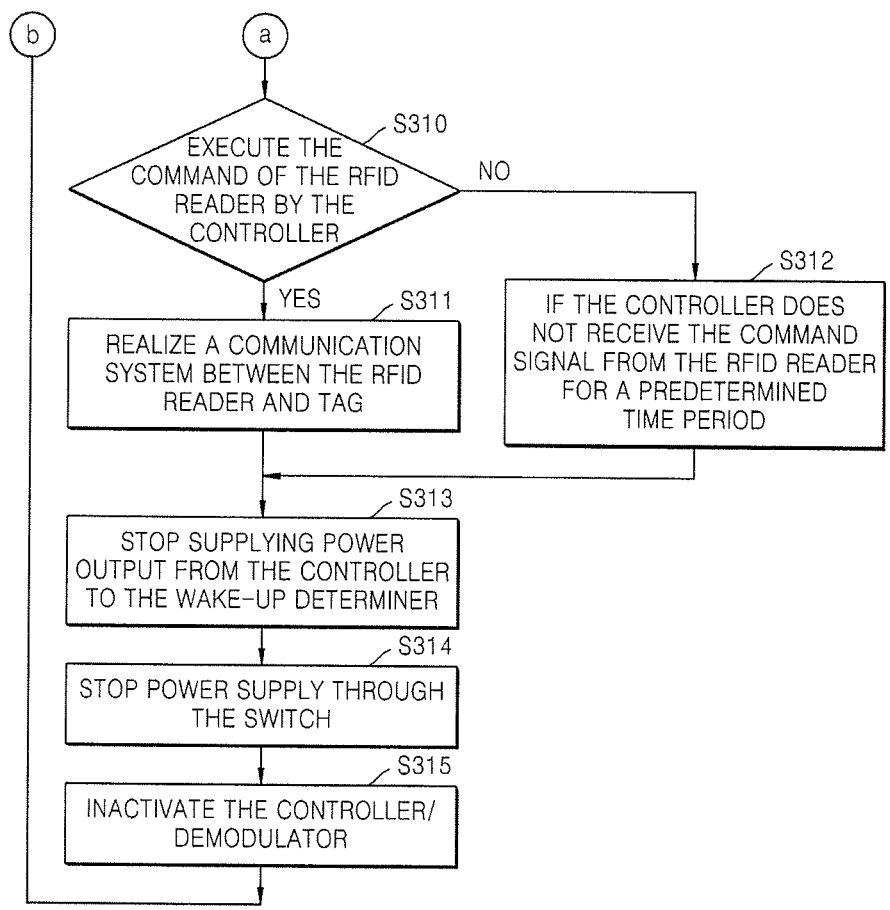

FIGS. 3A and 3B are a flowchart illustrating the operation of a battery-powered high RFID tag including an apparatus for stopping power supply according to an embodiment of the present invention. Referring to FIG. 3, the battery-assisted high RFID tag receives a signal of an RFID reader through an antenna (Operation 301), rectifies/boosts the received signal into a continuous electronic wave, and generates a DC voltage signal (Operation 302).

The battery-assisted high RFID tag compares a DC voltage with a reference voltage and determines whether to perform the next operation (Operation 302). If a value of the DC voltage is greater than that of the reference voltage (Operation 304), the battery-assisted high RFID tag transmits the DC voltage to a wake-up determiner (Operation 305). If the value of the DC voltage is less than that of the reference voltage in Operation 304, the battery-assisted high RFID tag returns to a stand-by mode in order to receive the signal of the RFID reader.

The reference voltage means that an input value of the wake-up determiner is recognized as HIGH. In detail, if the DC voltage is lower than the reference voltage, the input unit transmits a LOW signal to input terminals of the wake-up determiner so that an output value of the wake-up determiner is LOW, and, if the DC voltage is greater than the reference voltage, the input unit transmits a HIGH signal to the input terminals of the wake-up determiner so that the output value of the wake-up determiner is changed to HIGH.

Then, if the DC voltage is greater than the reference voltage, the wake-up determiner outputs HIGH, which is used to operate a switch so that the power of a power supplier is supplied to a low voltage output stabilizer (Operation 306).

The low voltage output stabilizer supplies the power to a controller and a demodulator included in a tag system so that the controller and the demodulator are activated.

The controller that changes from a stand-by mode to an active move supplies a stable voltage to the wake-up determiner, a high frequency generator, and a memory (Operation 308). The wake-up determiner supplies a stable HIGH signal to the switch using the HIGH signal input into the wake-up determiner so that the controller remains in the active mode.

In Operation 301, the battery-assisted high RFID tag receives a command from the RFID reader and transmits the command to the controller through the activated demodulator (Operation 309).

The activated controller executes the command, and the activated high frequency generator and memory execute a clock and access the memory in order to process the command (Operation 310).

The controller that executes the command of the RFID reader transmits the result of executing the command to the RFID reader through an output unit and the antenna (Operation 311).

However, if the controller does not receive a command from the RFID reader for a predetermined time period, the controller changes to the stand-by mode from the active mode so that the controller no longer transmits the HIGH signal to the wake-up determiner (Operation 313).

If the first and second input terminals of the wake-up determiner do not receive the HIGH signal from the controller, the switch stops operating (Operation 314), and the power supplier no longer supplies power to the tag system (Operation 315).

The tag system operates in the stand-by mode even if the power is not supplied to the tag system and the tag system awaits a new signal of the RFID reader.

Figure 4:
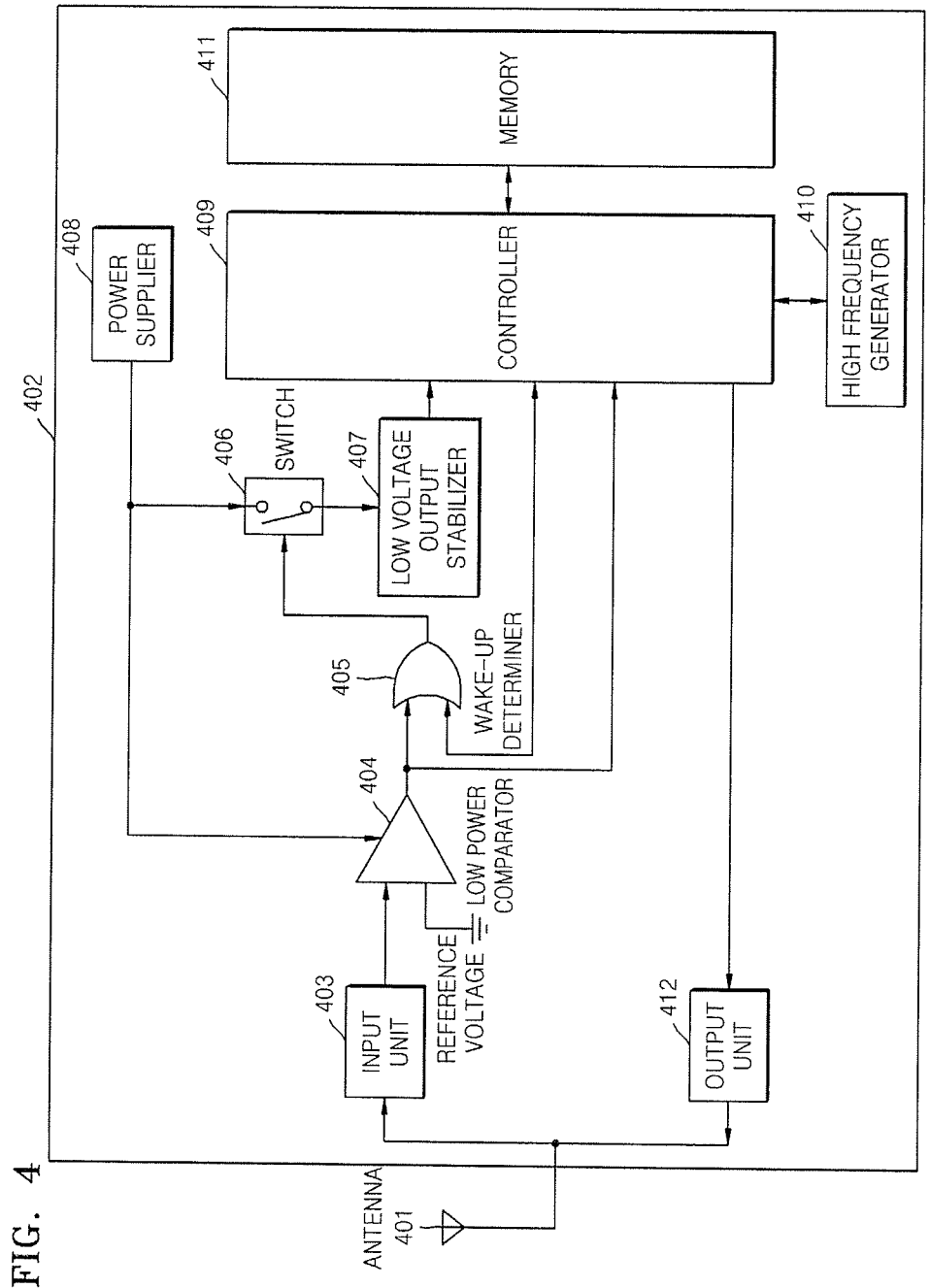
FIG. 4 is a block diagram of a battery-powered high RFID tag including an apparatus for stopping power supply according to another embodiment of the present invention.

FIG. 4 is a block diagram of a battery-assisted high RFID tag including an apparatus for stopping power supply according to another embodiment of the present invention. Referring to FIG. 4, the battery-assisted high RFID tag of the present invention includes an antenna 401 and a tag system 402. An input unit 403 of the tag system 402 receives a signal from a RFID reader through the antenna 401.

The signal input into the input unit 403 includes a continuous wave signal and a base band signal including a command of the RFID reader.

The input unit 403 rectifies and boosts the continuous wave signal received through the antenna 401 and outputs a direct-current (DC) voltage.

The DC voltage is input into a wake-up determiner 405 through a low power comparator 404. The low power comparator 404 is always driven by a minimum, not fluctuating current supplied by a power supplier 408 included in the battery-assisted high RFID tag. The low power comparator 404 transmits the base band signal of the RFID reader to the wake-up determiner 405 and a controller 409.

The wake-up determiner 405 includes an OR-gate having first and second input terminals in which if one of the first and second input terminals is HIGH, a HIGH output results.

The first input terminal of the wake-up determiner 405 receives the output of the low power comparator 404. The second input terminal of the wake-up determiner 405 receives a signal from the controller 409.

The wake-up determiner 405 that receives the output of the low power comparator 404 as the signal selectively outputs a HIGH signal in the following two cases, which is determined according to an application of a user. In the first case, the battery-assisted high RFID tag receives the continuous wave signal from the RFID reader, outputs the DC voltage that is rectified and boosted by the input unit 403, and transmits the DC voltage to the wake-up determiner 405 as a HIGH signal for a predetermined time period through the low power comparator 404.

The predetermined time period means time enough to change a stand-by mode of the controller 409 to an active mode through an operation of a switch 406 using the result of the wake-up determiner 405 and supply the power of the power supplier 408 to the controller 409.

In the second case, if the base band signal of the RFID reader includes a predetermined wake-up signal, the wake-up determiner 405 reads the predetermined wake-up signal, determines whether the predetermined wake-up signal is identical to the HIGH signal, and if both are determined to be identical to each other, outputs the predetermined wake-up signal as the HIGH signal.

In this case, a wake-up additional unit is required to determine whether the predetermined wake-up signal is identical to a HIGH signal.

The switch 406 determines whether to supply power of the power supplier 408 to the controller 409 according to the result of the wake-up determiner 405. If the wake-up determiner 405 outputs the HIGH signal, the power supplier 408 supplies a stable voltage to the controller 409 through a low voltage output stabilizer 407.

If the stable voltage is supplied to the controller 409, the controller 409 is changed from the stand-by mode to the active mode, and supplies the stable voltage to the wake-up determiner 405, a high frequency generator 410, and a memory 411.

The high frequency generator 410 provides a predetermined clock necessary for the operation of the tag system 402. The memory 411 provides a memory storing data necessary for the operation of the tag system 402.

The controller 409 that is in the active mode reads a following command of the RFID reader received through the low power comparator 404, executes the following command, and transmits the result of executing the command to the RFID reader through an output unit 412 and the antenna 401.

The present invention can also be embodied as computer readable code on a computer readable recording medium. The computer readable recording medium is any data storage device that can store data, which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion.

As described above, a method and apparatus for stopping power supply in a RFID system of the present invention stop a non-fluctuating current of a tag when the RFID system receives no signal from a RFID reader, and thereby, increasing the lifespan of a battery attached to a high RFID tag.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. An apparatus for stopping power supply to a radio frequency identification (RFID) system, the apparatus comprising:

a power supplier configured to supply power to an RFID tag;

an antenna configured to receive an input signal, wherein the input signal comprises a continuous portion and a base band portion in which the base band portion includes a command from an RFID reader;

an input unit coupled to the antenna, wherein the input unit is configured to rectify and boost the continuous portion and to subsequently output a direct-current (DC) signal, wherein the input unit is configured to output the DC signal in a LOW voltage state when the rectified and boosted continuous portion is less than a threshold voltage and the input unit is configured to output the DC signal in a HIGH voltage state when the rectified and boosted continuous portion is greater than the threshold voltage;

a wake-up determiner coupled to the input unit and to a controller, wherein the wake-up determiner is configured to compare the DC signal output from the input unit with a predetermined reference voltage from the controller and the wake-up determiner is configured to output a HIGH signal when either voltage states of the predetermined reference voltage or the DC signal are HIGH, and wherein the wake-up determiner is configured to output a LOW signal when voltage states of both the predetermined reference voltage and the DC voltage signal are LOW;

a demodulator coupled to the input unit and to the controller, wherein the demodulator is configured to read the command in the base band portion of the input signal from the input unit and to transmit the command to the controller;

the controller is configured to execute the command and the controller is configured to change voltage states of the predetermined reference voltage from HIGH to LOW after a clocked time period, and subsequent to when the controller is initially powered up then the controller is configured to change voltage states of the predetermined reference voltage from LOW to HIGH;

a switch coupled to the wake-up determiner, to the power supplier, and to a low voltage output stabilizer, wherein the switch is configured to stop power supply to the RFID tag when the wake-up determiner outputs the LOW signal to the switch and the switch is configured to connect power from the power supplier to the low voltage output stabilizer when the wake-up determiner outputs the HIGH signal; and the low voltage output stabilizer is configured to subsequently power the controller and the demodulator with a predetermined voltage.

2. The apparatus of claim 1, wherein the wake-up determiner comprises: a comparator configured to compare the DC signal from the input unit with the predetermined reference voltage from the controller.

3. The apparatus of claim 1, wherein the wake-up determiner comprises an OR gate.

4. The apparatus of claim 1, wherein the base band portion comprises a plurality of commands from the RFID reader.

5. The apparatus of claim 1, further comprising:

an output unit coupled to the controller, to the antenna, and to the input unit, wherein the output unit is configured to output a result of executing the command, wherein when the wake-up determiner outputs the HIGH signal, then the command of the RFID reader is subsequently executed.

6. A method of stopping power supply to a RFID system, the method comprising:

rectifying and boosting a continuous portion from an input signal to output a DC signal wherein when the rectified and boosted continuous portion is less than a threshold voltage then the DC signal is in a LOW voltage state and when the rectified and boosted continuous portion is greater than the threshold voltage then the DC signal is in a HIGH voltage state;

comparing the DC signal with a reference signal such that when voltage states of either the reference signal or the DC signal are HIGH then a HIGH signal is outputted and when voltage states of both the reference signal and the DC signal are LOW then a LOW signal is outputted;

extracting and transmitting a base band portion from the input signal wherein the base band portion comprises commands;

reading the commands in the base band portion;

executing the read commands;

switching power on to a controller and a demodulator with a predetermined voltage from a power supplier in response to a switch receiving the outputted HIGH signal; and changing the voltage state of the reference signal from HIGH to LOW after a clocked period has expired;

switching off power to the controller and the demodulator of the in response to the LOW signal.

7. The method of claim 6, wherein the base band portion comprises commands of a RFID reader.

8. The method of claim 6, wherein the HIGH signal or the LOW signal are output by an OR logical operator.

9. The method of claim 7, further comprising:

outputting an output signal in response to executing the commands.

10. An apparatus for stopping power supply to a radio frequency identification (RFID) system, the apparatus comprising:

an input unit configured to receive an input signal from an antenna, the input signal comprising a continuous wave portion and a base band portion in which the base band portion includes commands from an RFID reader, wherein the input unit is configured to rectify and boost the continuous portion and to subsequently output a direct-current (DC) signal, wherein the input unit is configured to output the DC signal in a LOW voltage state when the rectified and boosted continuous portion is less than a threshold voltage and the input unit is configured to output the DC signal in a HIGH voltage state when the rectified and boosted continuous portion is greater than the threshold voltage;

a wake-up determiner coupled the input unit and to a controller, wherein the wake-up determiner is configured to compare the DC signal output from the input unit with a predetermined reference voltage from the controller and the wake-up determiner is configured to output a HIGH signal when either voltage states of the predetermined reference voltage or the DC signal are HIGH, and wherein the wake-up determiner is configured to output a LOW signal when voltage states of both the predetermined reference voltage and the DC voltage signal are LOW;

a switch coupled to the wake-up determiner, a power supplier and a low voltage output stabilizer, wherein the switch is configured to disconnect the power supplier from the low voltage output stabilizer when the wake-up determiner outputs the LOW signal to the switch and wherein the switch is configured to connect the power supplier to the low voltage output stabilizer when the wake-up determiner outputs the HIGH signal;

the power supplier coupled to the switch;

the low voltage output stabilizer coupled to the switch, the controller and a demodulator, wherein the low voltage output stabilizer is configured to stabilize power from the power supplier to both the controller and demodulator;

the demodulator coupled to the input unit, the low voltage output stabilizer, and to the controller, wherein the demodulator is configured to read the commands in the base band portion and to transmit the commands to the controller;

the controller coupled to the low voltage output stabilizer, the demodulator, and an output unit, in which the controller is configured to execute the transmitted commands, wherein the controller is configured to change voltage states of the predetermined reference voltage from HIGH to LOW after a clocked time period, and wherein subsequent to when the controller is initially powered up then the controller is configured to change voltage states of the predetermined reference voltage from LOW to HIGH; and the output unit coupled to the controller, the antenna and the input unit, wherein the output unit is configured to transmit results of the executed commands.

11. The apparatus of claim 10, further comprising a memory coupled to the controller.

12. The apparatus of claim 10, further comprising a high frequency generator coupled to the controller for executing a clock so that the controller changes voltage states of the predetermined reference voltage from HIGH to LOW after the clocked time period.

13. The apparatus of claim 10, further comprising the antenna coupled to the input unit and to the output unit.

14. The apparatus of claim 10, wherein the wake-up determiner comprises an OR gate.

* * * * *